(12) United States Patent
Tsou et al.

(10) Patent No.: US 10,985,459 B2
(45) Date of Patent: Apr. 20, 2021

(54) ANTENNA STRUCTURE AND WIRELESS COMMUNICATION DEVICE USING THE SAME

(71) Applicant: Chiun Mai Communication Systems, Inc., New Taipei (TW)

(72) Inventors: Tun-Yuan Tsou, New Taipei (TW); Shu-Wei Jhang, New Taipei (TW); Yi-Te Chou, New Taipei (TW); Chang-Ching Huang, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 34 days.

(21) Appl. No.: 16/684,981

(22) Filed: Nov. 15, 2019

(65) Prior Publication Data
US 2020/0176870 A1    Jun. 4, 2020

(30) Foreign Application Priority Data

Nov. 30, 2018    (CN) .......................... 201811455055.6

(51) Int. Cl.
| | | |
|---|---|---|
| *H01Q 1/52* | (2006.01) | |
| *H01Q 5/335* | (2015.01) | |
| *H04B 1/00* | (2006.01) | |
| *H01Q 1/22* | (2006.01) | |
| *H01Q 1/24* | (2006.01) | |

(52) U.S. Cl.
CPC .......... *H01Q 5/335* (2015.01); *H01Q 1/2291* (2013.01); *H01Q 1/243* (2013.01); *H04B 1/0064* (2013.01)

(58) Field of Classification Search
CPC ..................................................... H01Q 5/335
USPC ....................................... 343/853, 702, 852
See application file for complete search history.

(56) References Cited

U.S. PATENT DOCUMENTS

| | | | |
|---|---|---|---|
| 9,960,489 B2 | 5/2018 | Kim et al. | |
| 2019/0393586 A1* | 12/2019 | Ayala Vazquez | ........ H01Q 9/42 |
| 2020/0106159 A1* | 4/2020 | Hsu ........................... | H01Q 1/50 |

FOREIGN PATENT DOCUMENTS

CN    105474460 B    8/2018

\* cited by examiner

*Primary Examiner* — Peguy Jean Pierre
(74) *Attorney, Agent, or Firm* — ScienBiziP, P.C.

(57) ABSTRACT

An antenna structure of few components and reduced size which functions by switching between components to achieve radiation in three different frequency bands includes two radiating portions, a feeding portion, a matching circuit, and a first switching circuit. With the first switching circuit closed, current flows along a first radiating portion to activate a first frequency band. A second radiating portion obtains the current from the first switching circuit by coupling with the first radiating portion, to activate a second frequency band. Current in the first radiating portion can activate a third frequency band. With the first switching circuit open, current in the first radiating portion activates radiation in the first frequency band. The second radiating portion can radiate in second frequency band by coupling current from the first radiating portion. Frequency multiplication of the first frequency band can activate the third frequency band.

18 Claims, 15 Drawing Sheets

ANTENNA STRUCTURE AND WIRELESS COMMUNICATION DEVICE USING THE SAME

FIELD

The subject matter herein generally relates to antennas.

BACKGROUND

Antennas in wireless communication devices are for receiving and transmitting wireless signals at different frequencies, such as signals in low, middle, high frequency bands, GPS frequency band, BT/Wi-Fi frequency band, and diversity frequency band. However, the antenna structure is complicated and occupies a large space in the wireless communication device, which is inconvenient for miniaturization of the wireless communication device.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
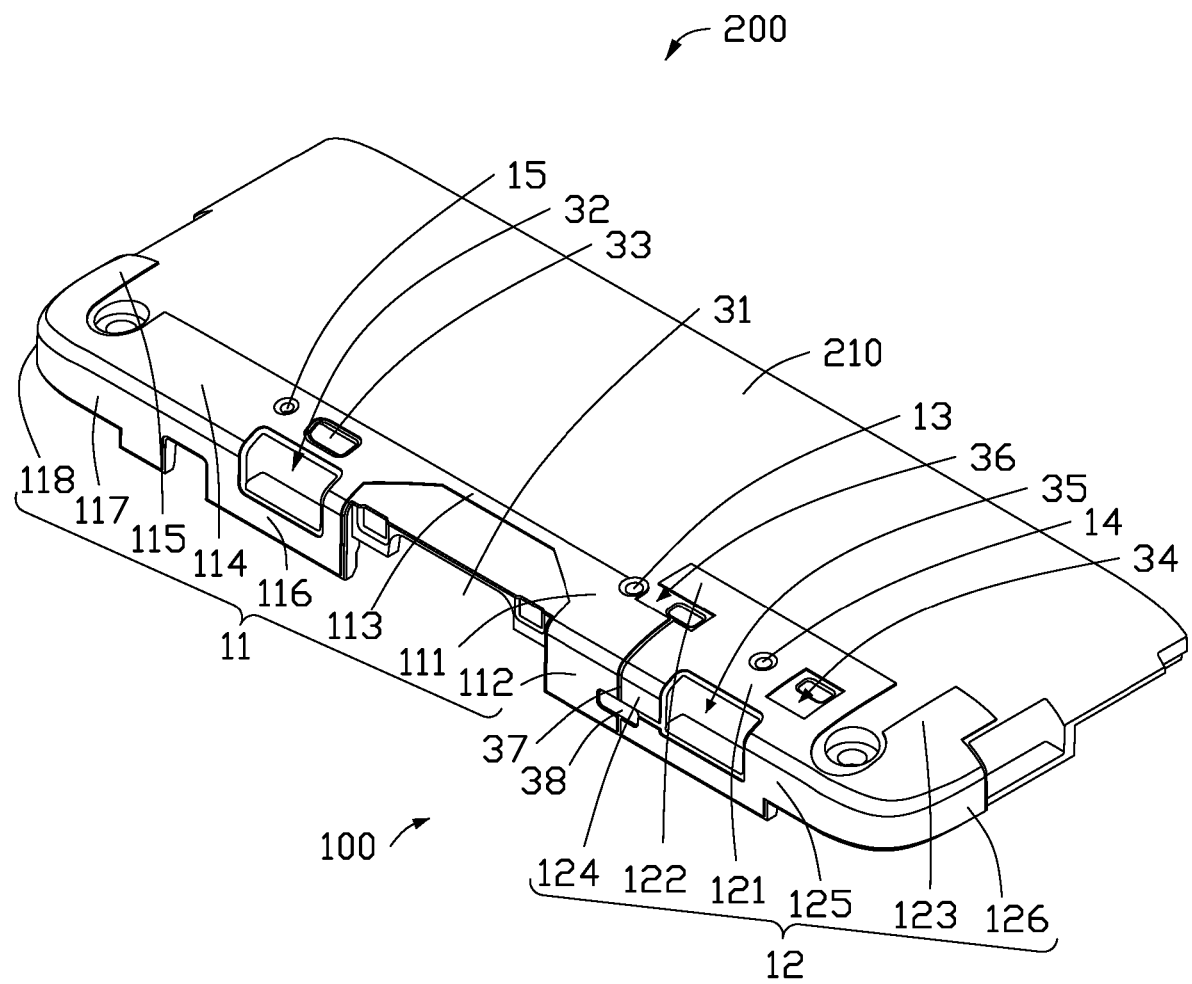
FIG. 1 is an isometric view of a wireless communication device using an antenna structure, according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using the same.

Figure 2:
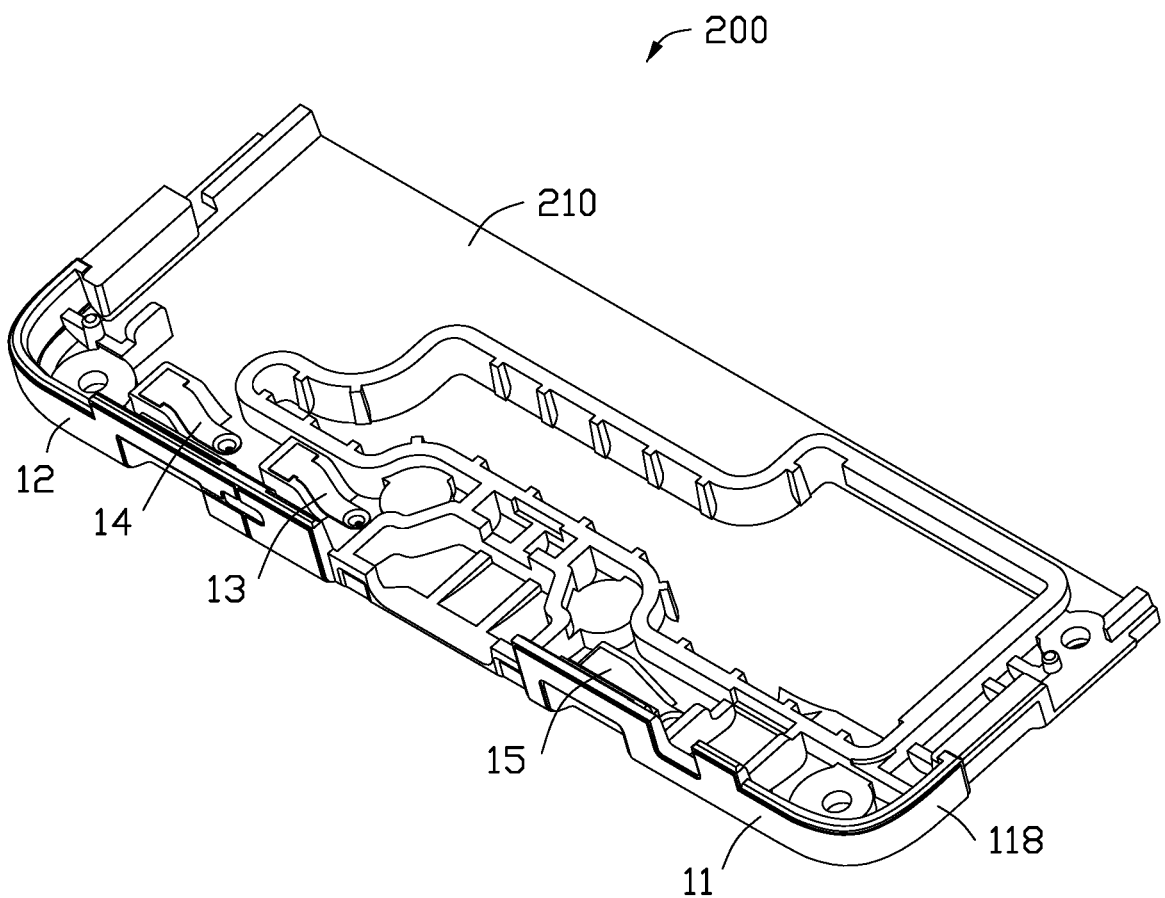
FIG. 2 is similar to FIG. 1, but shown from another angle.

FIG. 1 and FIG. 2 illustrate an embodiment of a wireless communication device 200 using an antenna structure 100. The wireless communication device 200 can be, for example, a mobile phone or a personal digital assistant. The antenna structure 100 can receive and transmit wireless signals.

Figure 3:
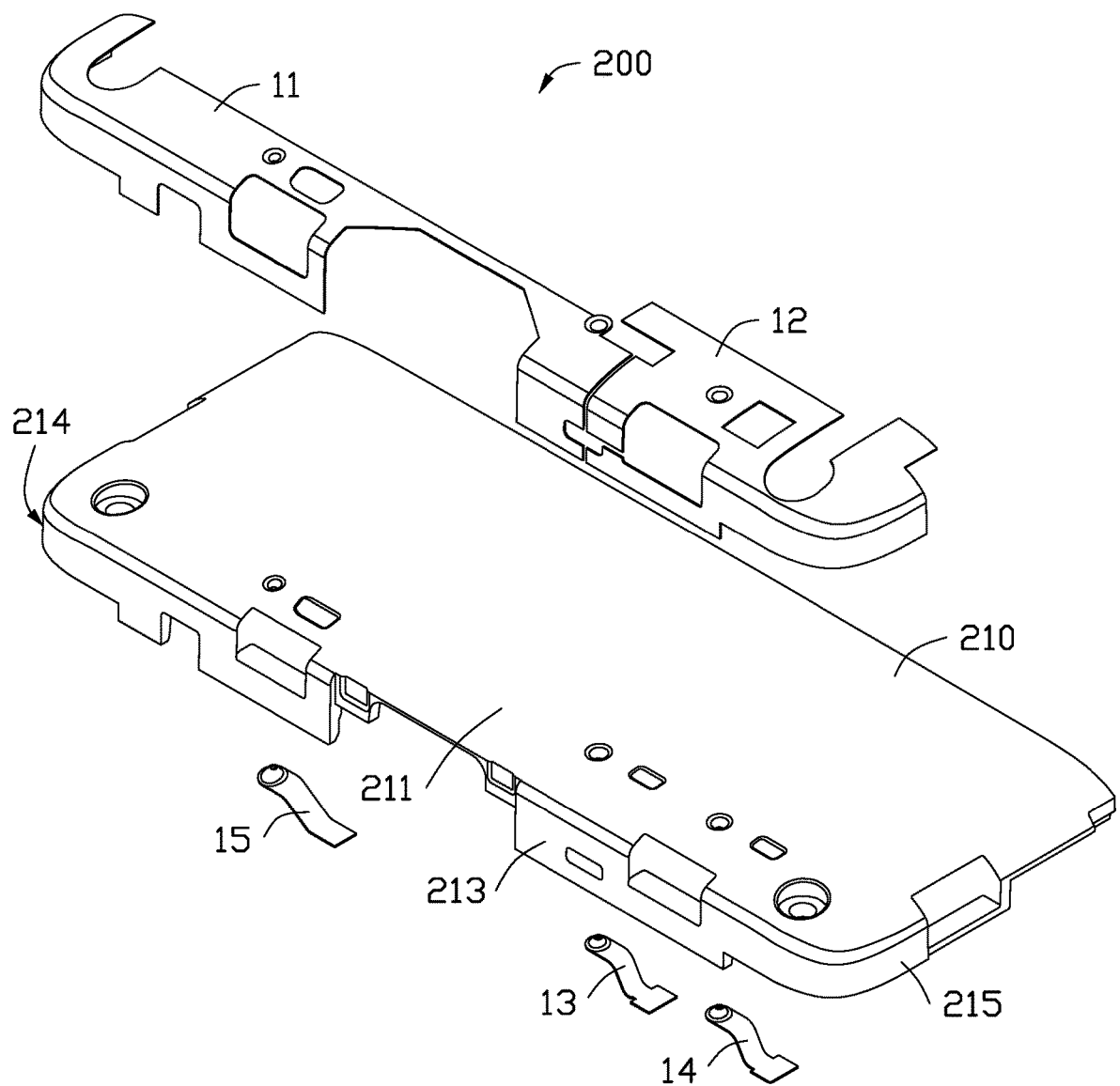
FIG. 3 is an exploded, isometric view of the wireless communication device of FIG. 1.

FIG. 3 shows the wireless communication device 200 including a base 210. The base 210 is used to support the antenna structure 100. In one embodiment, the base 210 can be a plastic member in a housing of the wireless communication device 200. The base 210 is substantially rectangular and includes a top surface 211, a first side surface 213, a second side surface 214, and a third side surface 215. The first side surface 213, the second side surface 214, and the third side surface 215 are all perpendicularly extended from the top surface 211. The top surface 211 forms a curved connection with sides of the first side surface 213, the second side surface 214, and the third side surface 215. The second surface 214 is spaced apart from and parallel to the third surface 215. The first surface 213 is connected between the second surface 214 and the third side surface 215.

Figure 4:
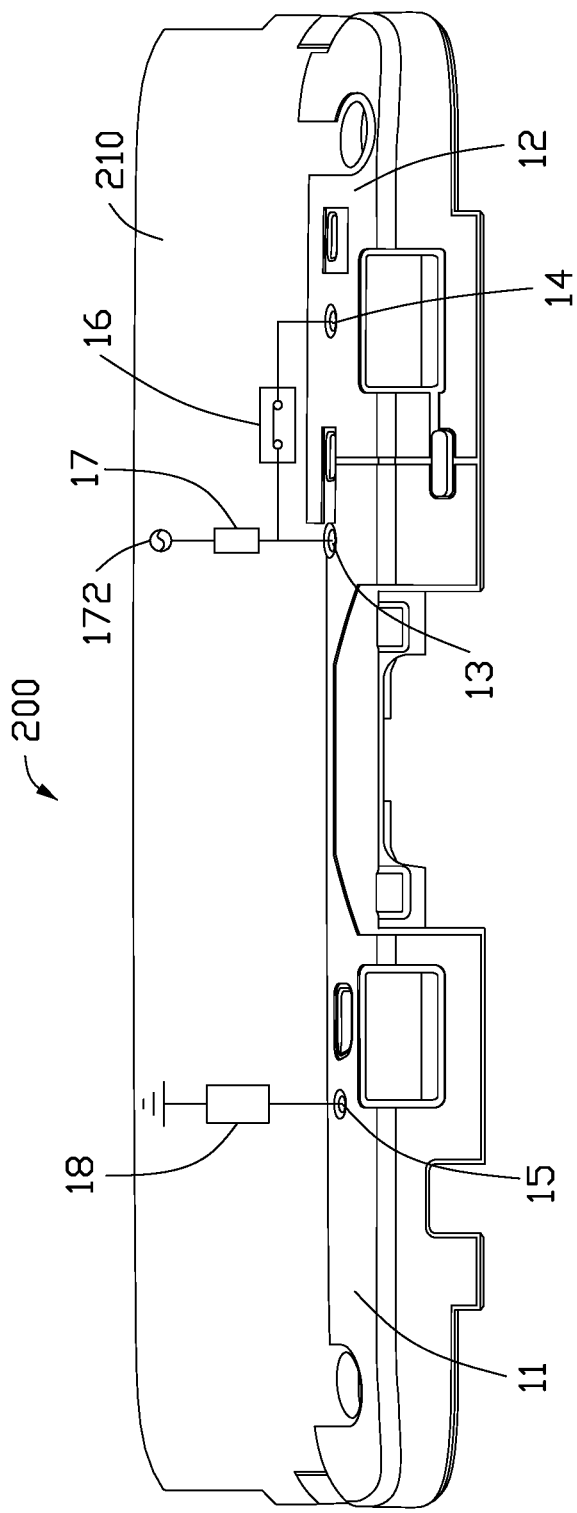
FIG. 4 is a schematic plan view of the antenna structure of FIG. 1, including a matching circuit, a first switching circuit, and a second switching circuit.

As illustrated in FIG. 1 to FIG. 3, the antenna structure 100 includes a first radiating portion 11, a second radiating portion 12, a feeding portion 13, a first grounding portion 14, a second grounding portion 15, a first switching circuit 16 (shown in FIG. 4 and FIG. 5), a matching circuit 17 (shown in FIG. 4), and a second switching circuit 18 (shown in FIG. 4).

The first radiating portion 11 is a multi-surfaced metal sheet. In one embodiment, the first radiating portion 11 is an integrally-formed metal sheet. The first radiating portion 11 can be divided into a number of radiating sections for purposes of description. The first radiating portion 11 thus includes first to eighth radiating sections, 111-118.

The first radiating section 111 is positioned at the top surface 211. The second radiating section 112 is positioned at the first side surface 213 and is perpendicularly connected to the first radiating section 111. The third radiating section 113 is substantially U-shaped and is positioned at a middle position of the top surface 211. The third radiating section 113 includes two end portions and a connecting portion. The connecting portion of the third radiating section 113 is perpendicularly connected to the two end portions of the third radiating section 113. A width of the connecting portion is less than a width of each of the two end portions of the third radiating section 113. One end portion of the third radiating section 113 is connected to each of the first radiating section 111 and the fourth radiating section 114.

The fourth radiating section 114 is substantially rectangular. The fourth radiating section 114 is positioned at the top surface 211 and is connected to one of the two end portions of the third radiating section 113 away from the first radiating section 111.

The fifth radiating section 115 is positioned at the top surface 211 and is connected to the fourth radiating section 114. The fifth radiating section 115 is substantially an asymmetric U-shaped metal sheet. The fifth radiating section 115 includes two arms. One arm of the fifth radiating section 115, connected to the fourth radiating section 114, is shorter than the other arm of the fifth radiating section 115.

The sixth radiating section 116 is positioned at the first side surface 213. The sixth radiating section 116 is substantially U-shaped. The sixth radiating section 116 is connected to the fourth radiating section 114 and is spaced apart from the second radiating section 112.

The seventh radiating section 117 is positioned at the first surface 213. The seventh radiating section 117 is substantially T-shaped and is connected to the fourth radiating section 114, the fifth radiating section 115, and the sixth radiating section 116. The eighth radiating section 118 is positioned at the second side surface 214. The eighth radiating section 118 is substantially rectangular and is connected to the fifth radiating section 115 and the seventh radiating section 117.

In one embodiment, the first radiating section 111 and the third to fifth radiating sections 113-115 are coplanar and are all positioned at the top surface 211. The first radiating section 111 and the third to fifth radiating sections 113-115 all extend towards the second side surface 214. The second, sixth, and seventh radiating sections 112, 116, and 117 are coplanar and are all positioned at the first side surface 213. The second, sixth, and seventh radiating sections 112, 116, and 117 all extend towards the second side surface 214.

In this embodiment, the first to fourth radiating sections 111-114, and the sixth radiating section 116 cooperatively form a first receiving hole 31. In this embodiment, the first receiving hole 31 is a universal serial bus (USB) hole. The fourth radiating section 114 and the sixth radiating section 116 forms a connecting portion (not labeled). The connecting portion formed by the fourth radiating section 114 and the sixth radiating section 116 define a second receiving hole 32 for receiving a connector (not shown). The fourth radiating section 114 further defines a third receiving hole 33. The third receiving hole 33 is positioned adjacent to the second receiving hole 32.

The second radiating portion 12 is a multi-surfaced metal sheet. In one embodiment, the second radiating portion 12 is an integrally-formed metal sheet. The second radiating portion 12 can also be divided into a number of radiating arms for purposes of description. The second radiating portion 12 thus includes first to sixth radiating arms 121-126.

The first radiating arm 121 is substantially rectangular. The first radiating arm 121 is positioned at the top surface 211 and is spaced apart from the first radiating section 111. The second radiating arm 122 is substantially rectangular and is positioned at the top surface 211. The second radiating arm 122 is connected to the first radiating arm 121 and extends towards the first radiating section 111.

The third radiating arm 123 is substantially an asymmetric U-shaped metal sheet. The third radiating arm 123 is positioned at the top surface 211 and is connected to the first radiating arm 121. The third radiating arm 123 itself includes two arms. One arm of the third radiating arm 123, connected to the first radiating arm 121, is shorter than the other arm of the third radiating arm 123.

The fourth radiating arm 124 is positioned at the first side surface 213. The fourth radiating arm 124 is connected to the first radiating arm 121 and is spaced apart from the second radiating section 112.

The fifth radiating arm 125 is positioned at the first side surface 213. The fifth radiating arm 12 is substantially a stepped metal sheet. One end of the fifth radiating arm 125 is connected to the first radiating arm 121. The other end of the fifth radiating arm 125 extends to be spaced apart from the fourth radiating arm 124 and the second radiating section 112. The sixth radiating arm 126 is positioned at the third surface 215. The sixth radiating arm 126 is connected to the third radiating arm 123 and the fifth radiating arm 125.

In one embodiment, the first to third radiating arms 121-123 are coplanar. The first to third radiating arms 121-123 are all positioned at the top surface 211 and extend towards the third side surface 215. The fourth radiating arm 124 and the fifth radiating arm 125 are coplanar and are both positioned at the first side surface 213.

The first radiating arm 121 defines a fourth receiving hole 34. The first, fourth, and fifth radiating arms 121, 124, 125 cooperatively form a fifth receiving hole 35. The fifth receiving hole 35 is used to receive a connector (not shown). The first radiating arm 121, the second radiating arm 122, and the first radiating section 111 cooperatively form a sixth receiving hole 36.

The first radiating section 111, the second radiating section 112, the first radiating arm 121, and the fifth radiating arm 125 cooperatively define a first slit 37. The first slit 37 is substantially rectangular. The second radiating section 112 and the fifth radiating arm 125 cooperatively define a second slit 38. The second slit 38 can communicate with the first slit 37.

In one embodiment, the feeding portion 13 is a sliver of metal. The feeding portion 13 is positioned at a surface opposite to the top surface 211. One end of the feeding portion 13 is connected to the first radiating section 111. The feeding portion 13 is further electrically connected to a feeding source 172 (shown in FIG. 4) through the matching circuit 17. The feeding portion 13 feeds current from the feeding source 172 to the first radiating section 111. In one embodiment, the feeding source 172 can be positioned on a circuit board of the wireless communication device 200.

In one embodiment, the first grounding portion 14 is a sliver of metal. The first grounding portion 14 is positioned at a surface opposite to the top surface 211 and is spaced apart from the feeding portion 13. One end of the first grounding portion 14 is connected to the first radiating arm 121. The first grounding portion 14 is further grounded. In this embodiment, the circuit board of the wireless communication device 200 provides ground connection for the first grounding portion 14.

In one embodiment, the second grounding portion 15 is a sliver of metal. The second grounding portion 15 is positioned at a surface opposite to the top surface 211 and is spaced apart from the feeding portion 13 and the first grounding portion 14. One end of the second grounding portion 15 is connected to the fourth radiating section 114. The second grounding portion 15 is further grounded. In this embodiment, the circuit board of the wireless communication device 200 provides ground connection for the second grounding portion 15.

As illustrated in FIG. 4, the matching circuit 17 is positioned at the circuit board. One end of the matching circuit 17 is electrically connected to the feeding portion 13. The other end of the matching circuit 17 is electrically connected to the feeding source 172. The matching circuit 172 can be an inductor, a capacitor, or a combination of inductor and capacitor.

One end of the first switching circuit 16 is electrically connected to the feeding portion 13. Other end of the first switching circuit 16 is electrically connected to the first grounding portion 14. In this embodiment, the first switching circuit 16 is a single-pole single-throw switch for controlling the first radiating portion 11 to electrically connect to or disconnect from the second radiating portion 12.

Figure 5:
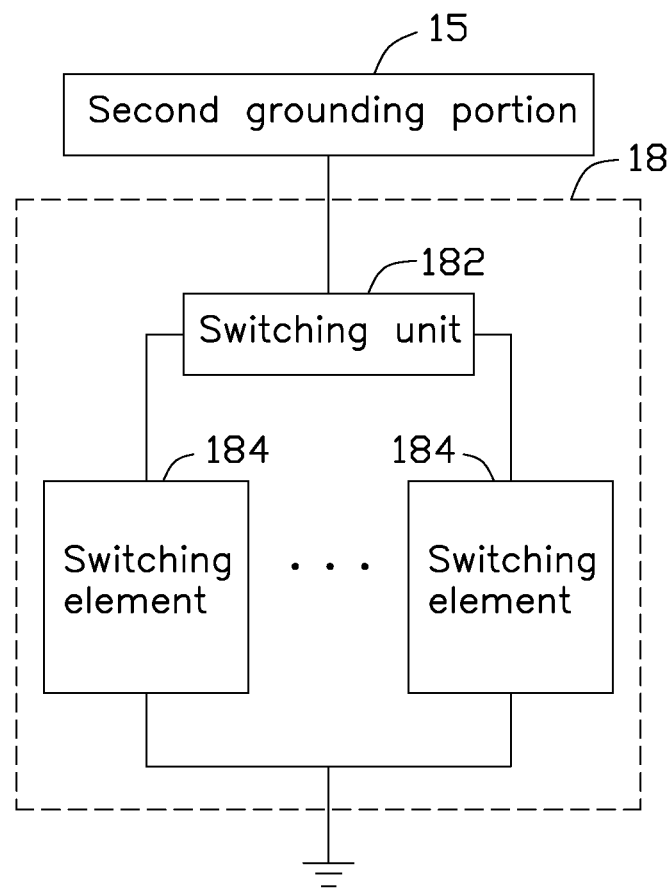
FIG. 5 is a block diagram of the second switching circuit of the antenna structure of FIG. 4.

As illustrated in FIG. 4 and FIG. 5, in this embodiment, the second switching circuit 18 is positioned at the circuit board. One end of the second switching circuit 18 is electrically connected to the second grounding portion 15. Other end of the second switching circuit 18 is grounded.

The second switching circuit 18 includes a switching unit 182 and a plurality of switching elements 184. The switching unit 182 is electrically connected to the second grounding portion 15. Then, the switching unit 182 is electrically connected to the first radiating portion 11 through the second grounding portion 15. The switching elements 184 can be an inductor, a capacitor, or a combination of the inductor and the capacitor. The switching elements 184 are connected in parallel to each other. One end of each switching element 184 is electrically connected to the switching unit 182. The other end of each switching element 184 is grounded. The switching unit 182 can switch the first radiating portion 11 to connect with different switching elements 184.

Figure 6:
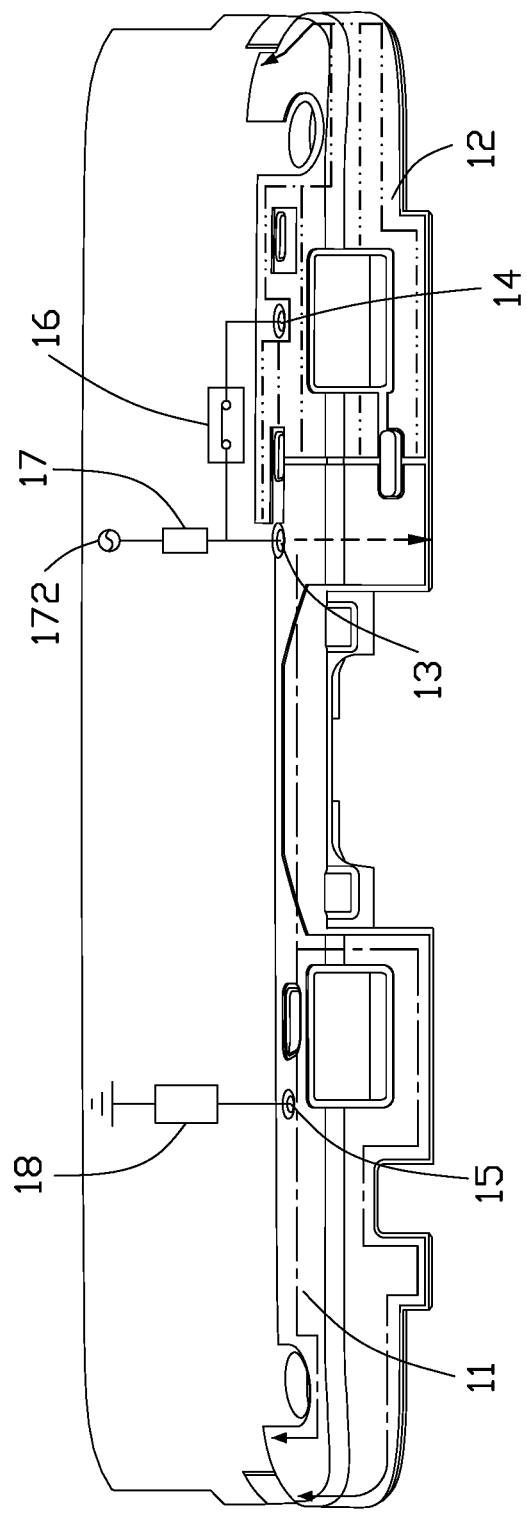
FIG. 6 is a current path distribution graph of the antenna structure of FIG. 4, when the first switching circuit is in a closed state.

As illustrated in FIG. 6, when the first switching circuit 16 is in a closed state, the first radiating portion 11 is electrically connected to the second radiating portion 12. The feeding portion 13 feeds current from the feeding source 172 through the matching circuit 17. Along the third radiating section 113, current flows through the fourth to eighth radiating sections 114-118, to activate a first operating mode to generate radiation signals in a first frequency band. In an embodiment, the first operating mode is a long term evolution advanced (LTE-A) low frequency operating mode. The first frequency band is LTE-A 704-960 MHz.

One portion of the current further flows to the second radiating portion 12 through the first switching circuit 16. Another portion of the current is coupled to the second radiating portion 12 through the first radiating portion 11. The current flows through the radiating portion 12 to activate a second operating mode to generate radiation signals in a second frequency band. In an embodiment, the second operating mode is an LTE-A middle frequency operating mode. The second frequency band is LTE-A 1710-2170 MHz.

The current further flows through the first radiating section 111 and the second radiating section 112 to activate a third operating mode to generate radiation signals in a third frequency band. In an embodiment, the third operating mode is an LTE-A high frequency operating mode. The third frequency band is LTE-A 2300-2700 MHz.

Figure 7:
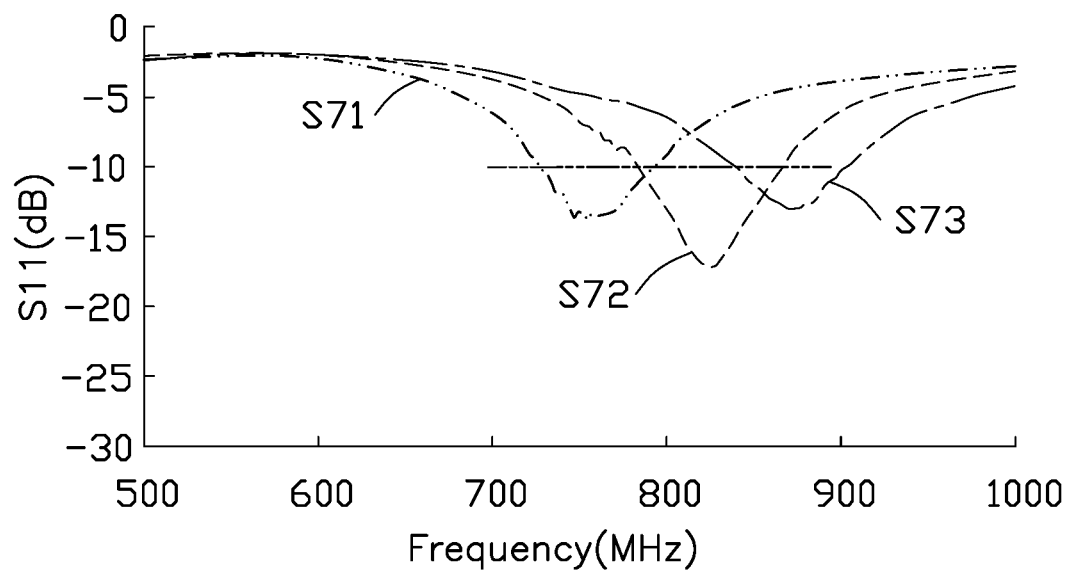
FIG. 7 is a scattering parameter graph when the antenna structure works at a low frequency band and the first switching circuit of FIG. 6 is in a closed state.

FIG. 7 is a scattering parameter (the S11 parameters) graph when the first switching circuit 16 is in a closed state and the antenna structure 100 works at the first frequency band. Curve S71 is a scattering parameter when the antenna structure 100 works at LTE-A Band 12. Curve S72 is a scattering parameter when the antenna structure 100 works at LTE-A Band 14. Curve S73 is a scattering parameter when the antenna structure 100 works at LTE-A Band 5.

Figure 8:
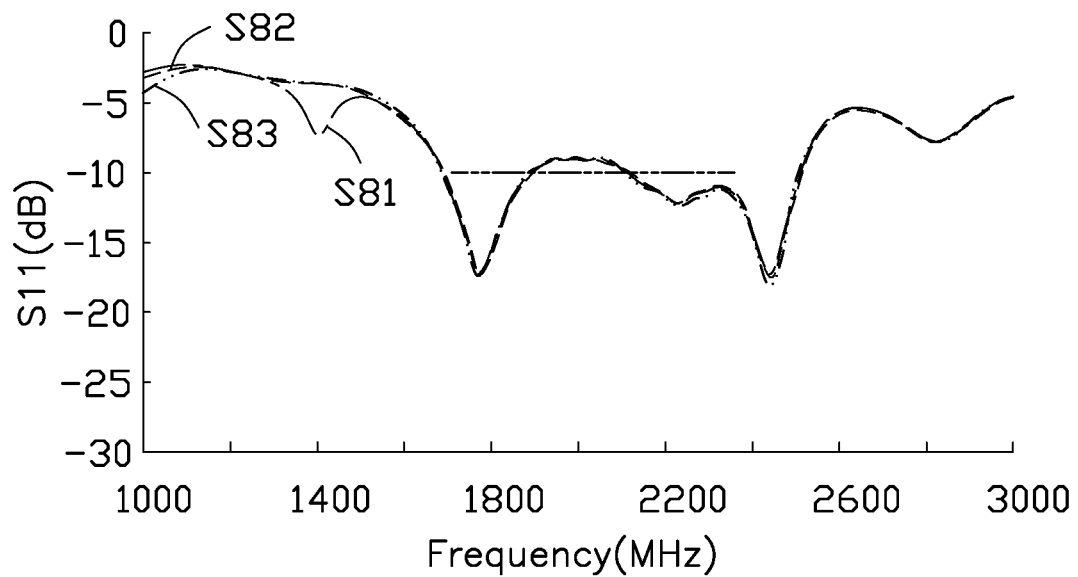
FIG. 8 is a scattering parameter graph when the antenna structure works at middle and high frequency bands and the first switching circuit of FIG. 6 is in a closed state.

FIG. 8 is a scattering parameter graph when the first switching circuit 16 is in the closed state and the antenna structure 100 works at the second and third frequency bands. Curve S81 is a scattering parameter when the antenna structure 100 works at LTE-A Band 12. Curve S82 is a scattering parameter when the antenna structure 100 works at LTE-A Band 14. Curve S83 is a scattering parameter when the antenna structure 100 works at LTE-A Band 5.

Figure 9:
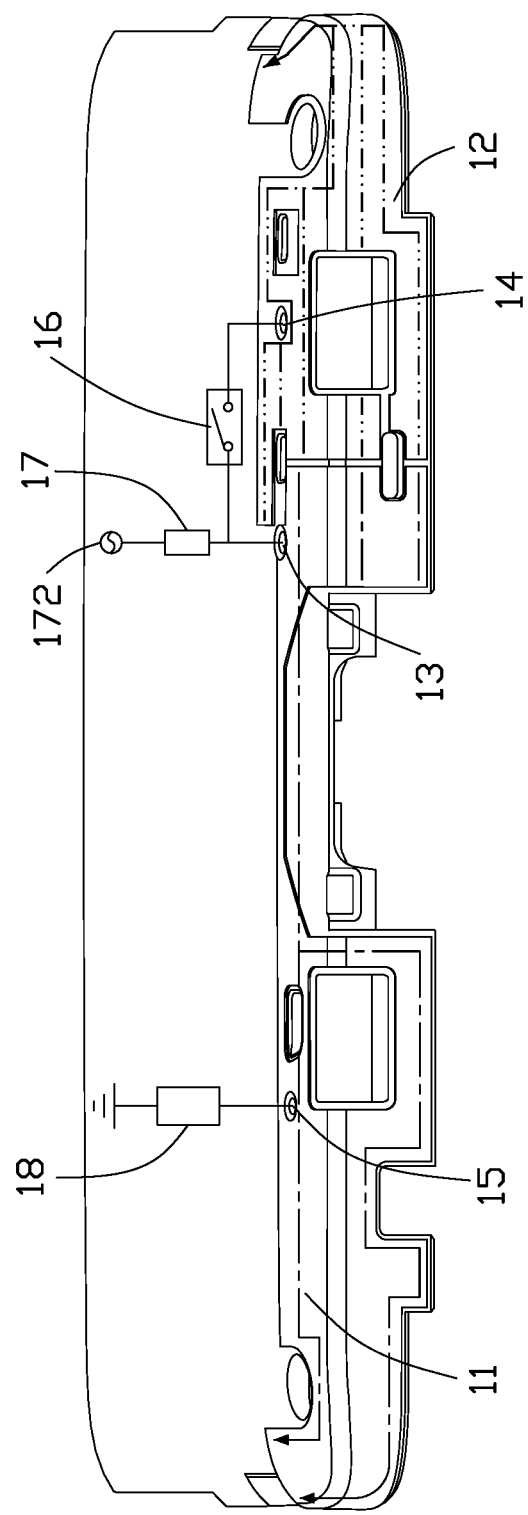
FIG. 9 is a current path distribution graph of the antenna structure of FIG. 4, when the first switching circuit is in an open state.

As illustrated in FIG. 9, when the first switching circuit 16 is in an open state, the first radiating portion 11 is disconnected from the second radiating portion 12. The feeding portion 13 feeds current from the feeding source 172 through the matching circuit 17. The current feeds to the first radiating portion 11 and flows through the first radiating portion 11 to activate the first operating mode.

The current is further coupled to the second radiating portion 12 through the first radiating portion 11. The current flows through the second radiating portion 12 to activate the second operating mode. The third frequency band generated by the third operating mode is activated by frequency multiplication of the first frequency band.

Figure 10:
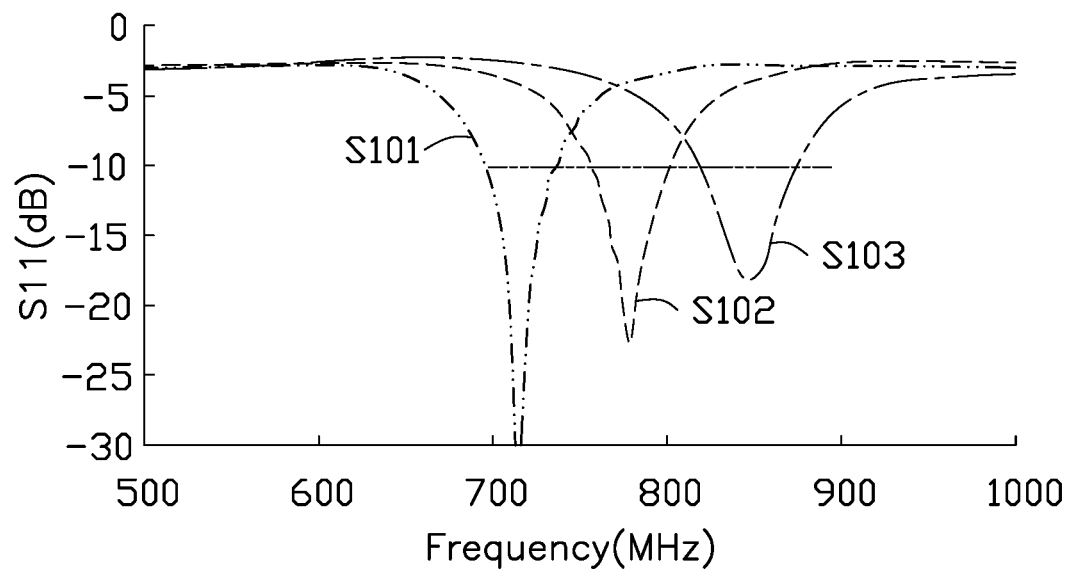
FIG. 10 is a scattering parameter graph when the antenna structure works at a low frequency band and the first switching circuit of FIG. 9 is in an open state.

FIG. 10 is a scattering parameter graph when the first switching circuit 16 is in an open state and the antenna structure 100 works at the first frequency band. Curve S101 is a scattering parameter when the antenna structure 100 works at LTE-A Band 12. Curve S102 is a scattering parameter when the antenna structure 100 works at LTE-A Band 14. Curve S103 is a scattering parameter when the antenna structure 100 works at LTE-A Band 5.

Figure 11:
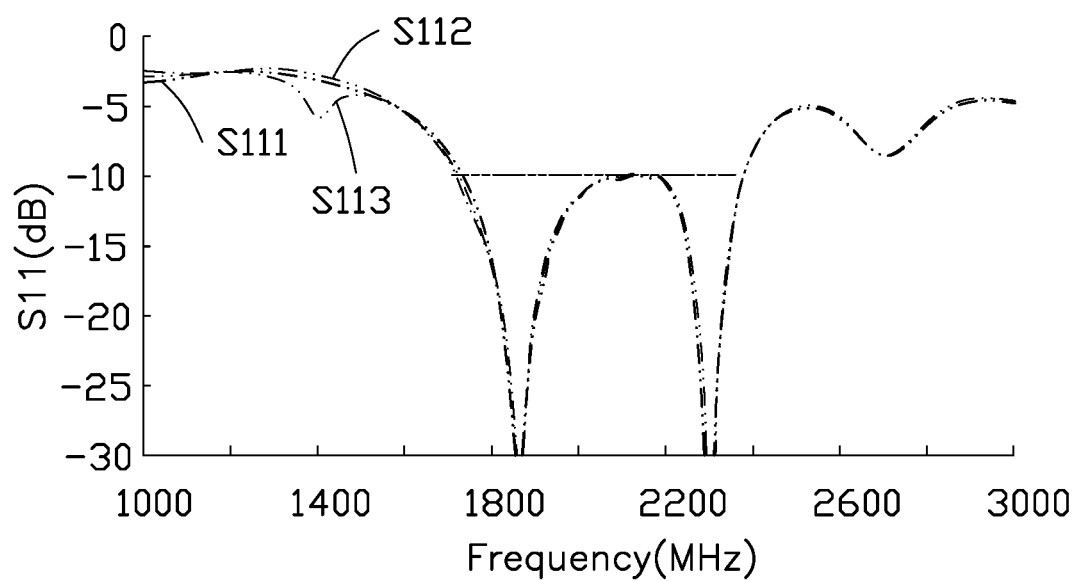
FIG. 11 is a scattering parameter graph when the antenna structure works at middle and high frequency bands and the first switching circuit of FIG. 9 is in an open state.

FIG. 11 is a scattering parameter graph when the first switching circuit 16 is in the open state and the antenna structure 100 works at the second and third frequency bands. Curve S111 is a scattering parameter when the antenna structure 100 works at LTE-A Band 12. Curve S112 is a scattering parameter when the antenna structure 100 works at LTE-A Band 14. Curve S113 is a scattering parameter when the antenna structure 100 works at LTE-A Band 5.

Since each of the switching elements 184 of the second switching circuit 18 has a different impedance, a frequency band of the first operating mode of the first radiating portion 11 can be adjusted by the switching unit 182. The adjustment of the frequency band shifts the frequency band to a lower or a higher frequency.

A resonant frequency portion of the antenna structure 100 is determined by the dimensions of the first slit 37 and the second slit 38. By adjusting the dimensions of the first slit 37 and the second slit 38, the resonant frequency of the antenna structure 100 can be modified, such that the resonant frequency is a value which is correct for the LTE-A communication specification.

Figure 12:
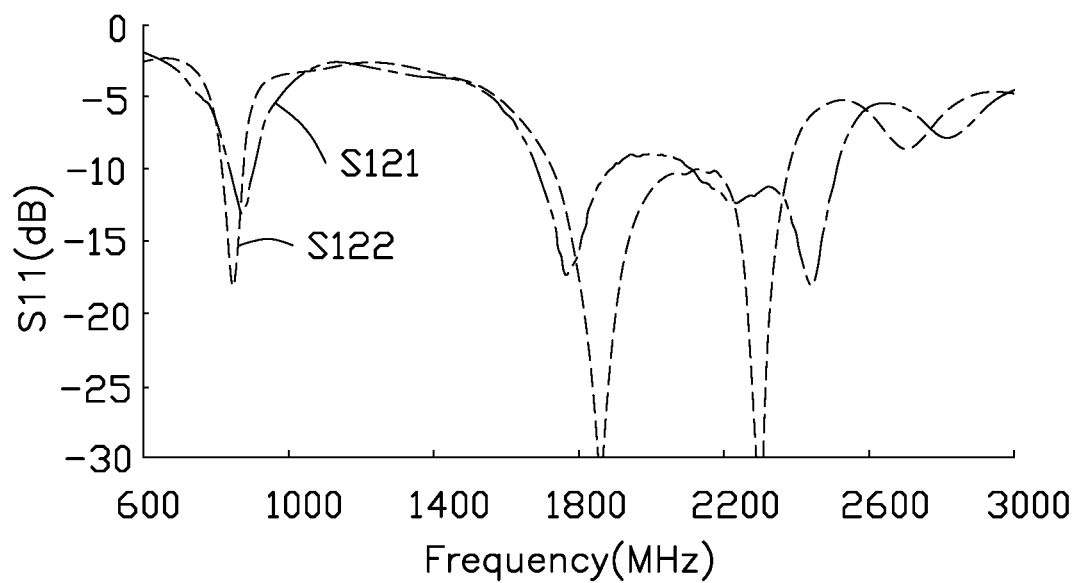
FIG. 12 is a scattering parameter graph of the antenna structure, when the wireless communication device is not handheld by a user.

FIG. 12 is a scattering parameter graph of the antenna structure 100 when the wireless communication device 200 is not handheld by a user (that is, the wireless communication device 200 is vacant). Curve S121 is a scattering parameter of the antenna structure 100 when the first switching circuit 16 is in the closed state. Curve S122 is a scattering parameter of the antenna structure 100 when the first switching circuit 16 is in the open state.

Figure 13:
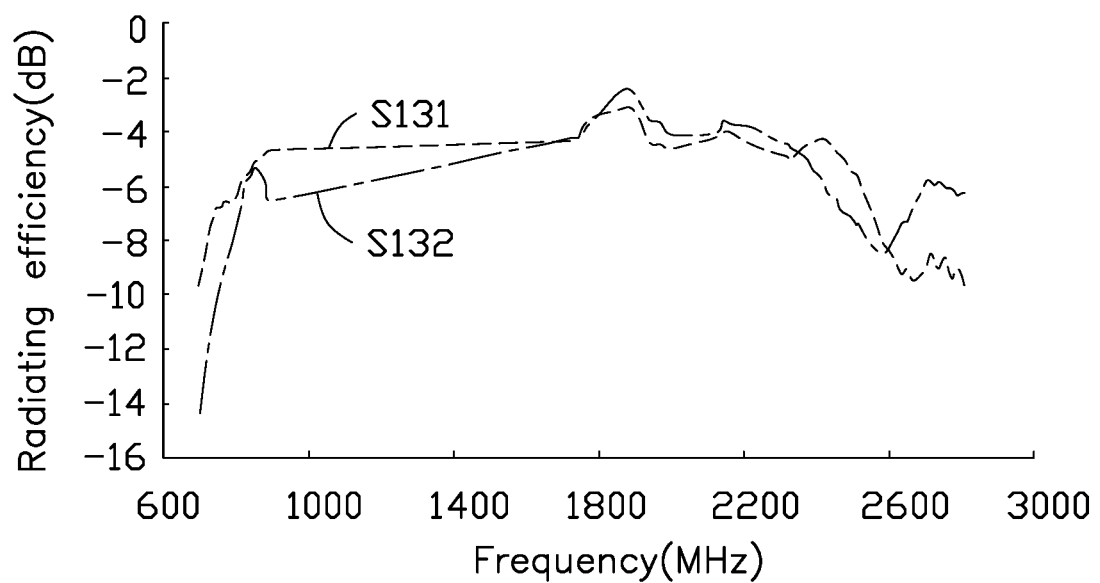
FIG. 13 is a radiating efficiency graph of the antenna structure, when the wireless communication device is not handheld by a user.

FIG. 13 is a radiating efficiency graph of the antenna structure 100 when the wireless communication device 200 is not handheld by a user. Curve S131 is a radiating efficiency of the antenna structure 100 when the first switching circuit 16 is in the closed state. Curve S132 is a radiating efficiency of the antenna structure 100 when the first switching circuit 16 is in the open state.

As FIG. 12 and FIG. 13 show, when the switching circuit 16 is in the closed state, the antenna structure 100 has a good radiating performance at the low frequency band (700-960 MHz) and the high frequency band (2300-2700 MHz). When the switching circuit 16 is in the open state, the antenna structure 100 has a good radiating performance at the middle frequency band (1710-2170 MHz).

Figure 14:
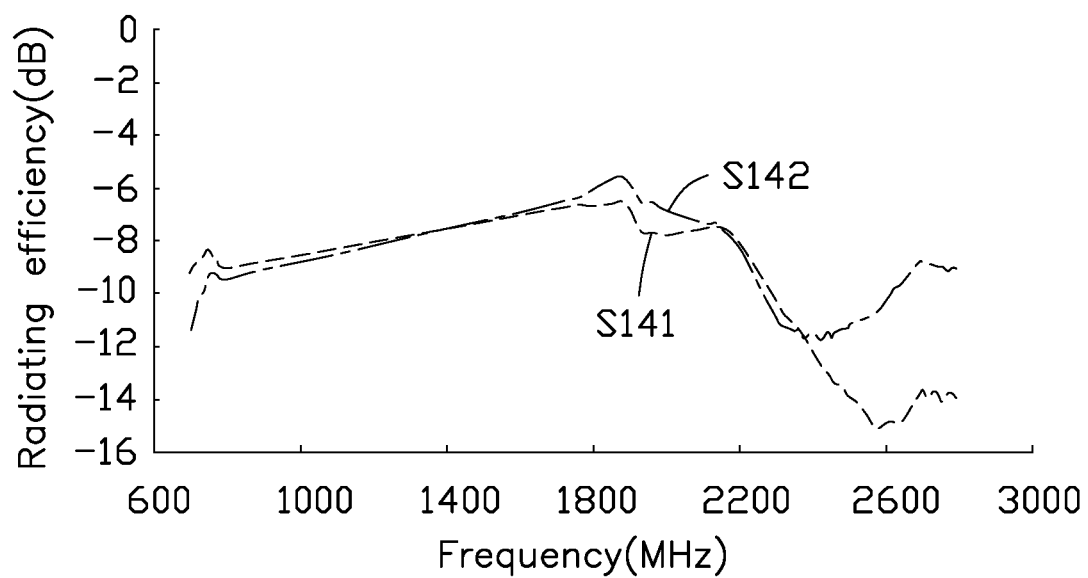
FIG. 14 is a radiating efficiency graph of the antenna structure, when the wireless communication device is handheld in user's right hand.

FIG. 14 is a radiating efficiency graph of the antenna structure 100 when the wireless communication device 200 is handheld, in user's right hand. Curve S141 is a radiating efficiency of the antenna structure 100 when the first switching circuit 16 is in the closed state. Curve S142 is a radiating efficiency of the antenna structure 100 when the first switching circuit 16 is in the open state.

Figure 15:
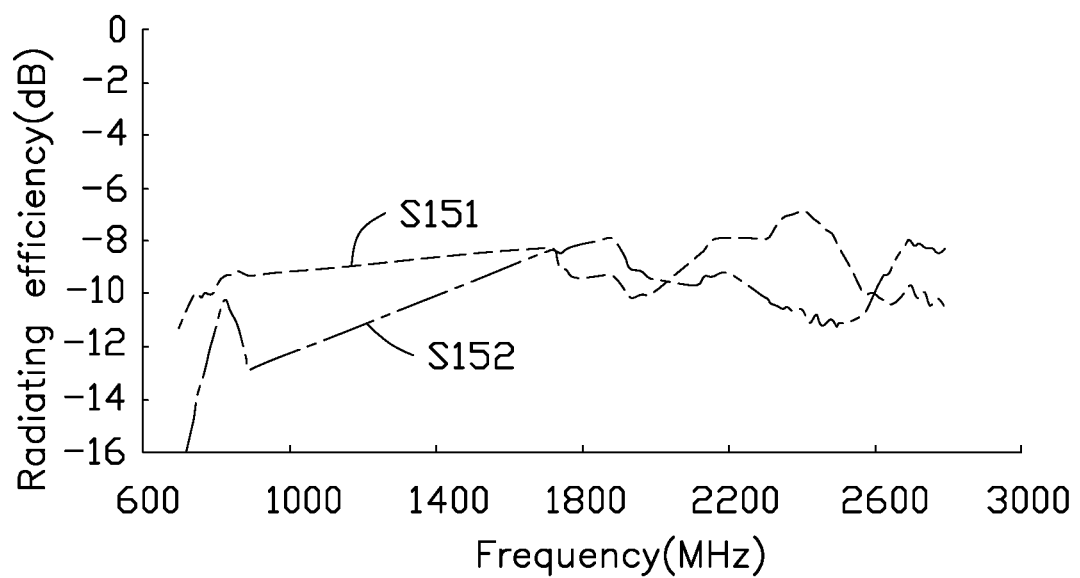
FIG. 15 is a radiating efficiency graph of the antenna structure, when the wireless communication device is handheld in user's left hand.

FIG. 15 is a radiating efficiency graph of the antenna structure 100 when the wireless communication device 200 is handheld, in user's left hand. Curve S151 is a radiating efficiency of the antenna structure 100 when the first switching circuit 16 is in the closed state. Curve S152 is a radiating efficiency of the antenna structure 100 when the first switching circuit 16 is in the open state.

As FIG. 14 and FIG. 15 show, when the switching circuit 16 is in the closed state and the wireless communication device 200 is handheld, the antenna structure 100 has a good radiating performance at the low frequency band (700-960 MHz) and at the high frequency band (2300-2700 MHz). When the switching circuit 16 is in the open state and the wireless communication device 200 is handheld, the antenna structure 100 has a good radiating performance at the middle frequency band (1710-2170 MHz).

The antenna structure 100 includes the first switching circuit 16. The first switching circuit 16 is positioned between the first radiating portion 11 and the second radiating portion 12 which are spaced apart from each other. The first radiating portion 11 and the second radiating portion 12 can be controlled by the first switching circuit 16, so that the antenna structure 100 can obtain good radiation performance in different frequency bands.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:
   a first radiating portion;
   a second radiating portion spaced apart from the first radiating portion;
   a matching circuit;
   a feeding portion, one end of the feeding portion connected to the first radiating portion, another end of the feeding portion electrically connected to a feeding source through the matching circuit; and
   a first switching circuit, the first switching circuit electrically connected between the first radiating portion and the second radiating portion;
   wherein when the first switching circuit is in a closed state, the first radiating portion is electrically connected to the second radiating portion, the feeding portion supplies current from the feeding source to the first radiating portion, the current flows towards a first direction along the first radiating portion to activate radiation signals in a first frequency band; the second radiating portion obtains the current from the first switching circuit by coupling with the first radiating portion, the current further flows through the matching circuit to activate radiation signals in a second frequency band; the current flows towards a second direction along the first radiating portion to activate radiation signals in a third frequency band;
   wherein when the first switching circuit is in an open state, the first radiating portion disconnect from the second radiating portion, the current flows along the first radiating portion to activate radiation signals in the first frequency band; the second radiating portion obtains the current by coupling with the first radiating portion to activate radiation signals in the second frequency band, a frequency multiplication of the first frequency band further activate radiation signals in the third frequency band; and
   wherein a frequency of the first frequency band is less than a frequency of the second frequency band, a frequency of the second frequency band is less than a frequency of the third frequency band.

2. The antenna structure of claim 1, wherein the first radiating portion is an integrally-formed metal sheet, the first radiating portion comprises a first radiating section, a second radiating section, a third radiating section, a fourth radiating section, a fifth radiating section, a sixth radiating section, a seventh radiating section, and an eighth radiating section;
   the second radiating section is connected to the first radiating section;
   the third radiating section is substantially U-shaped and comprises two end portions and a connecting portion, the connecting portion of the third radiating section is perpendicularly connected to the two end portions of the third radiating section, the two end portions of the third radiating section are respectively connected to the first radiating section and the fourth radiating section;
   the fourth radiating section is substantially rectangular;
   the fifth radiating section is substantially an asymmetric U-shaped metal sheet and is connected to the fourth radiating section, one arm of the fifth radiating section connected to the fourth radiating section is shorter than another arm of the fifth radiating section;
   the sixth radiating section is substantially U-shaped, the sixth radiating section is connected to the fourth radiating section and is spaced apart from the second radiating section;
   the seventh radiating section is substantially T-shaped and is connected to the fourth radiating section, the fifth radiating section, and the sixth radiating section;

the eighth radiating section is substantially rectangular and is connected to the fifth radiating section and the seventh radiating section.

3. The antenna structure of claim 2, wherein the first, and third to fifth radiating sections are coplanar and are positioned at a first plane;
the second, sixth, and seventh radiating sections are coplanar and are positioned at a second plane; and
the eighth radiating section is positioned at a third plane.

4. The antenna structure of claim 3, wherein the first to fourth, and sixth radiating sections cooperatively form a first receiving hole;
the fourth radiating section and the sixth radiating section forms a connecting portion, the connecting portion defines a second receiving hole; and
the fourth radiating section further defines a third receiving hole adjacent to the second receiving hole.

5. The antenna structure of claim 4, wherein the second radiating portion is substantially a multi-surfaced and integrally-formed metal sheet, the second radiating portion comprises a first radiating arm, a second radiating arm, a third radiating arm, a fourth radiating arm, a fifth radiating arm, and a sixth radiating arm;
the first radiating arm is substantially rectangular and is spaced apart from the first radiating section;
the second radiating arm is substantially rectangular, the second radiating arm is connected to the first radiating arm and extends towards the first radiating section;
the third radiating arm is substantially an asymmetric U-shaped metal sheet and is connected to the first radiating arm, the third radiating arm comprises two arms, one arm of the third radiating arm connected to the first radiating arm is shorter than another arm of the third radiating arm;
the fourth radiating arm is connected to the first radiating arm and is spaced apart from the second radiating section;
the fifth radiating arm is substantially a stepped metal sheet, one end of the fifth radiating arm is connected to the first radiating arm, another end of the fifth radiating arm extends to be spaced apart from the fourth radiating arm and the second radiating section; and
the sixth radiating arm is connected to the third radiating arm and the fifth radiating arm.

6. The antenna structure of claim 5, wherein the second radiating arm, the first radiating arm, and the third radiating arm are coplanar and are positioned at the first plane;
the fourth radiating arm and the fifth radiating arm are coplanar and are positioned at the second plane; and
the sixth radiating arm is positioned at a fourth plane.

7. The antenna structure of claim 6, wherein the first radiating arm defines a fourth receiving hole;
the first radiating arm, the fourth radiating arm, and the fifth radiating arm cooperatively form a fifth receiving hole;
the first radiating arm, the second radiating arm, and the first radiating section cooperatively form a sixth receiving hole;
the first radiating section, the second radiating section, the first radiating arm, the fifth radiating arm cooperatively define a first slit, the first slit is substantially rectangular; and
the second radiating section and the fifth radiating arm cooperatively define a second slit communicated with the first slit.

8. The antenna structure of claim 7, further comprising a first grounding portion and a second grounding portion, wherein the feeding portion is a sliver of metal, one end of the feeding portion is connected to the first radiating section;
the first grounding portion is a sliver of metal, one end of the first grounding portion is connected to the first radiating arm and is grounded; and
the second grounding portion is a sliver of metal, one end of the second grounding portion is connected to the fourth radiating section and is grounded through a second switching circuit.

9. The antenna structure of claim 8, wherein one end of the matching circuit is electrically connected to the feeding portion, another end of the matching circuit is electrically connected to the feeding source.

10. The antenna structure of claim 9, wherein one end of the first switching circuit is electrically connected to the feeding portion, another end of the first switching circuit is electrically connected to the first grounding portion; and
the first switching circuit is a single-pole single-throw switch for controlling the first radiating portion to electrically connect to or disconnect from the second radiating portion.

11. The antenna structure of claim 10, wherein one end of the second switching circuit is electrically connected to the second grounding portion, another end of the second switching circuit is grounded;
the second switching circuit comprises a switching unit and a plurality of switching elements, the switching unit is electrically connected to the first radiating portion, one end of each switching element is electrically connected to the switching unit, the other end of each switching element is grounded; and
the switching unit switches the first radiating portion to connect with different switching elements.

12. The antenna structure of claim 11, wherein when the first switching circuit is in the closed state, the first radiating portion is electrically connected to the second radiating portion, the feeding portion feeds current from the feeding source through the matching circuit, the current, along the third radiating section, flows through the fourth to eighth radiating sections, to activate a first operating mode to generate radiation signals in the first frequency band, the first operating mode is a long term evolution advanced (LTE-A) low frequency operating mode, the first frequency band is about LTE-A 704-960 MHz;
one portion of the current further flows to the second radiating portion through the first switching circuit, another portion of the current is coupled to the second radiating portion through the first radiating portion, the current flows through the radiating portion to activate a second operating mode to generate radiation signals in the second frequency band, the second operating mode is an LTE-A middle frequency operating mode, and the second frequency band is about LTE-A 1710-2170 MHz; and
the current further flows through the first radiating section and the second radiating section to activate a third operating mode to generate radiation signals in the third frequency band, the third operating mode is an LTE-A high frequency operating mode, and the third frequency band is about LTE-A 2300-2700 MHz.

13. The antenna structure of claim 12, wherein when the first switching circuit is in the open state, the first radiating portion is disconnected with the second radiating portion, the feeding portion feeds current from the feeding source through the matching circuit, the current feeds to the first radiating portion, flows through the first radiating portion to activate the first operating mode to generate radiation signals in the first frequency band;

the current is further coupled to the second radiating portion through the first radiating portion, the current flows through the second radiating portion to activate the second operating mode to generate radiation signals in the second frequency band; and the third frequency band generated by the third operating mode is activated by frequency multiplication of the first frequency band.

14. The antenna structure of claim 13, wherein a resonant frequency portion of the antenna structure is determined by the dimensions of the first slit and the second slit.

15. A wireless communication device comprising:
a base, and
an antenna structure positioned on the base, the antenna structure comprising:
    a first radiating portion;
    a second radiating portion spaced apart from the first radiating portion;
    a matching circuit;
    a feeding portion, one end of the feeding portion connected to the first radiating portion, another end of the feeding portion electrically connected to a feeding source through the matching circuit; and
    a first switching circuit, the first switching circuit electrically connected between the first radiating portion and the second radiating portion;
    wherein when the first switching circuit is in a closed state, the first radiating portion is electrically connected to the second radiating portion, the feeding portion supplies current from the feeding source to the first radiating portion, the current flows towards a first direction along the first radiating portion to activate radiation signals in a first frequency band; the second radiating portion obtains the current from the first switching circuit by coupling with the first radiating portion, the current further flows through the matching circuit to activate radiation signals in a second frequency band; the current flows towards a second direction along the first radiating portion to activate radiation signals in a third frequency band;
    wherein when the first switching circuit is in an open state, the first radiating portion disconnect from the second radiating portion, the current flows along the first radiating portion to activate radiation signals in the first frequency band; the second radiating portion obtains the current by coupling with the first radiating portion to activate radiation signals in the second frequency band, a frequency multiplication of the first frequency band further activate radiation signals in the third frequency band; and
    wherein a frequency of the first frequency band is less than a frequency of the second frequency band, a frequency of the second frequency band is less than a frequency of the third frequency band.

16. The wireless communication device of claim 15, wherein the base is substantially rectangular and comprises a top surface, a first side surface, a second side surface, and a third side surface, the first to third side surfaces are all perpendicularly extended from the top surface, the top surface forms a curved connection with sides of the first to third side surfaces, the second surface is spaced apart from and parallel to the third surface, the first surface is connected between the second surface and the third side surface.

17. The wireless communication device of claim 16, wherein the first radiating portion is an integrally-formed metal sheet, the first radiating portion comprises a first radiating section, a second radiating section, a third radiating section, a fourth radiating section, a fifth radiating section, a sixth radiating section, a seventh radiating section, and an eighth radiating section;

the first, third to fifth radiating sections are positioned at the top surface and extends towards the second side surface;

the second, sixth, and seventh radiating sections are positioned at the first side surface and extends toward the second side surface; and the eighth radiating section is positioned at the second side surface.

18. The wireless communication device of claim 16, wherein the second radiating portion comprises a first radiating arm, a second radiating arm, a third radiating arm, a fourth radiating arm, a fifth radiating arm, and a sixth radiating arm;

the first to third radiating arms are positioned at the top surface and extends towards the third side surface;

the fourth radiating arm and the fifth radiating arm are positioned at the first side surface; and the sixth radiating arm is positioned at the third side surface.

* * * * *